March 27, 1956  E. STUMP  2,739,578
PRECOMBUSTION DIESEL ENGINE
Filed July 18, 1951
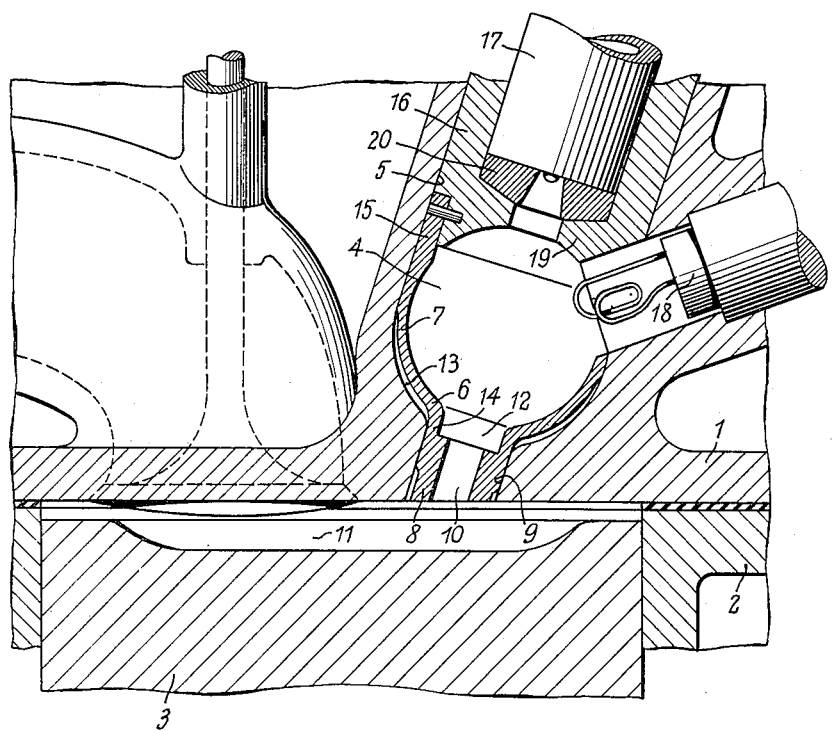
Inventor
Eugen Stump
By Austin, Linke, Wilhelm & Padloy
Attorneys

2,739,578

PRECOMBUSTION DIESEL ENGINE

Eugen Stump, Stuttgart-Unterturkheim, Germany, assignor to Daimler-Benz Aktiengesellschaft, Stuttgart-Unterturkheim, Germany Application July 18, 1951, Serial No. 237,400

Claims priority, application Germany July 20, 1950

5 Claims. (Cl. 123—32)

This invention relates to a diesel engine with a precombustion chamber which is in communication with the main combustion chamber by means of a restricted passage arranged in the axial direction of the injection nozzle and permitting injection therethrough directly into the main combustion chamber. In such a precombustion engine the hot, compressed air—having been compressed in the cylinder space during the compression stroke—rushes into the precombustion chamber in a relatively sharp jet and so in the direction of the fuel injection nozzle, whereby the latter in conjunction with the ensuing ignition and combustion—taking place in the precombustion chamber—is subjected to high thermal stresses.

An object of the present invention is an improved control and utilization of the heat occurring in the combustion chambers for the purpose of obtaining better engine performance and lower fuel consumption.

A further object of the present invention is to protect the injection nozzle so as to prevent it from being detrimentally affected by the high temperatures.

A still further object of the present invention is to improve the smoothness of operation of the engine, primarily at idling speeds.

The present invention therefore comprises in a precombustion diesel engine insertion means completely lining the precombustion chamber and also surrounding the throttling passage between the combustion chambers and covering the injection nozzle with the exception of a central opening needed for injection purposes so that the air, which during the compression stroke streams through the passage into the precombustion chamber, is diverted by the insertion means; and an in itself known annular intermediate member of pliable material possessing high heat conductivity being interposed, so as to be in close contact, between the end face of the injection nozzle (situated toward the precombustion chamber) and the insertion means, whereby the heat is quickly carried away from the nozzle, and overheating of it is obviated.

In order to explain the invention further a preferred embodiment thereof as applied to a precombustion diesel engine will now be described, by way of example by reference to the accompanying drawing which shows a cross section through an internal combustion engine. In the water-cooled cylinder head 1 of the internal combustion engine, having a cylinder 2 and a piston 3, there is provided a precombustion chamber 4, the axis of which is arranged obliquely and eccentrically as to the cylinder axis in a bore 5 of the cylinder head 1. The precombustion chamber 4 is essentially of spherical shape and formed principally of an insert 6 consisting of a cup-shaped upper portion 7 and a sleeve-like lower portion 8. The latter is partially tightly mounted in the bore 9 of the cylinder head 1 and contains the throttling passage 10 connecting the precombustion chamber 4 with the main combustion chamber which essentially is formed by a somewhat eccentrical cavity 11 in the piston head when the piston is in the upper dead-center. The throttling passage 10 has an enlargement 12 before it flares out to meet the precombustion chamber 4, the enlargement 12 being sharply stepped down toward the throttling passage 10. The upper, for example, thin-walled portion 7 of the insert 6 is insulated against the wall of the cylinder head by an insulation space 13 in the form of an annular gap extending to the lower portion 8 of the insert in such a manner that the particular portion of the insert 6 which forms the enlargement 12 has also at its point 14 no direct contact with the surrounding wall.

In addition, the upper portion 7 of the insert is upwardly extended by a cylindrical portion 15 which is screwed to or inserted into a muff-shaped insert 16 surrounding the injection nozzle 17 and at the same time forming the upper boundary-wall of the precombustion chamber 4. Alternatively, a glow plug 18 may be arranged on one side thereof.

By means of the insert above described—completely lining the precombustion chamber and that also on the side of the injection nozzle—the walls of the precombustion chamber can be uniformly heated. The instreaming hot air stream coming from the cylinder space therefore does not sustain any detrimental heat losses and the fuel is most effectively and favorably prepared for ignition. Knocking, which easily occurs in the lower speed ranges, can thus, in conjunction with the remainder of the precombustion chamber construction, be completely obviated. This effect is further enhanced by the spherical form of precombustion chamber due to its least possible area of radiating surface. At the same time such a precombustion chamber of spherical shape effects a thorough mixing of fuel and air by means of the rotating air swirls created therein.

Further, there is an intermediate piece 20, of pliable material possessing high heat conductivity, for example, copper, interposed between the injection nozzle 17 and the collar-shaped portion 19 of the insert 16 forming the upper end of the precombustion chamber. This intermediate piece 20 is urged, on the one hand, into close contact with the front face of the injection nozzle and, on the other hand, with the collar 19 when the injection nozzle is tightened. Consequently, the heat transmitted to the injection nozzle 17 can be passed along via this intermediate piece 20 to the outer insert so that the injection nozzle cannot be detrimentally affected by the accumulated heat in the collar 19. It has been proven that, due to the close pliable contact of the intermediate piece, the dissipation of heat from the injection nozzle surpasses the influence of the hot insert exerted upon the injection nozzle. The heat drop from the injection nozzle to the surrounding muff is, therefore, intensified by the insert although it is in direct contact therewith. Thus, the heat is carried away and overheating and seizing of the needle valve is prevented. This is of great importance in view of the high temperatures the insert is subjected to while the engine is in operation.

By means of the enlargement 12 of the throttling passage 10 above described, the advantage is obtained that the air streaming into the precombustion chamber will only be so long in contact with the surface of the passage 10 as is necessary for creating a high degree of controlled turbulence which is directed against the nozzle tip, whereby losses due to friction or caused by the transfer of heat to the walls are obviated. Along with this, local air swirls in the enlargement or adjacent thereto are promoted, i. e., at a point where the injected fuel and the air streaming into the precombustion chamber meets each other.

The integral insert 6 comprising upper portion 7 and lower portion 8 can be removed together with the muff 16 as a single unit by pulling it up in axial direction of the injection nozzle. Thus is attained an engine simpler in design and cheaper to build.

Precombustion diesel engines embodying the invention excel by particularly prompt and orderly combustion, low fuel consumption, smoothness and flexibility of operation and exceptional reliability in service.

What is claimed is:

1. Diesel engine comprising, a cylinder space with a piston therein defining the main combustion chamber in the upper dead-center position of said piston, a cylinder head, a cooling water jacket in said cylinder head, said cylinder head having a hollow space in communication with said main combustion chamber, removable hollow insert means substantially completely lining said hollow space, said insert means forming an essentially spherical combustion chamber and providing a throttling passage establishing communication between said main combustion chamber and said precombustion chamber, an injection nozzle opposite said throttling passage and adapted for straight line fuel injection through said precombustion chamber and through said throttling passage into said main combustion chamber, said throttling passage discharging freely into said main combustion chamber and having a relatively small diameter compared with the diameter of the precombustion chamber so as to produce a well-defined jet of air in the direction of said injection nozzle during the compression stroke of said piston, said insert means shielding said injection nozzle toward said precombustion chamber and providing only a central opening therein for injecting fuel therethrough, and an annular intermediate member of pliable heat-conducting material between said insert means and the lower end face of said injection nozzle for shielding said injection nozzle, said intermediate member being in tight contact with said insert means and with the lower end face of said injection nozzle.

2. Diesel engine according to claim 1, wherein said insert means forming said throttling passage contains an essentially cylindrical throttle passage and an essentially cylindrical sharp-edged enlargement thereof, said enlargement being situated at the end of said throttle passage adjacent said precombustion chamber and being open on the end facing the same.

3. Diesel engine according to claim 1 wherein said insert means is formed of an integral member surrounding said throttling passage and said precombustion chamber and of a second insert member connected with said first insert member and surrounding said injection nozzle and containing the shield portion for shielding said injection nozzle toward said precombustion chamber.

4. In a diesel engine a cylinder space with a piston therein defining the main combustion chamber in the upper dead-center position of said piston, said main combustion chamber being formed essentially by a recess in the piston head, a cylinder head, a cooling water jacket in said cylinder head, said cylinder head being provided with a hollow space in communication with said main combustion chamber, removable hollow insert means substantially completely lining said hollow space, said insert means being insulated at least over a portion thereof from said cylinder head and forming an essentially spherical combustion chamber and a cylindrical throttling passage establishing communication between said main combustion chamber and said precombustion chamber, an injection nozzle opposite said throttling passage and adapted for straight-line fuel injection through said precombustion chamber and through said throttling passage into said main combustion chamber, said throttling passage having a relatively small diameter compared with the diameter of the precombustion chamber so as to produce a well-defined jet of air in the direction of said injection nozzle during the compression stroke of said piston, said insert means being provided with a collar-like inwardly-directed extension constituting the upper terminal wall of said spherical combustion chamber and shielding said injection nozzle in the direction of said precombustion chamber, said collar-like extension providing only a central opening therein for projecting fuel therethrough, and an annular intermediate member of pliable heat-conducting material between the collar-like extension of said insert means and the lower end face of said injection nozzle for shielding said injection nozzle, said intermediate member being in tight contact with said collar-like extension and the lower face of said injection nozzle, the throttling passage of said insert means discharging freely into said main combustion chamber at a point adjacent an essentially central, relatively deep portion in said recess forming said main combustion chamber.

5. In a diesel engine a cylinder space with a piston therein defining the main combustion chamber in the upper dead-center position of said piston, said main combustion chamber being formed essentially by a recess in the piston head, a cylinder head, a cooling water jacket in said cylinder head, said cylinder head being provided with a hollow space in communication with said main combustion chamber, removable hollow insert means substantially completely lining said hollow space, said insert means being insulated at least over a portion thereof from said cylinder head and forming an essentially spherical combustion chamber and a cylindrical throttling passage establishing communication between said main combustion chamber and said precombustion chamber, an injection nozzle opposite said throttling passage and adapted for straight-line fuel injection through said precombustion chamber and through said throttling passage into said main combustion chamber, said throttling passage being provided with a sharp-edged enlargement at the inlet thereof adjacent said precombustion chamber and having a relatively small diameter compared with the diameter of the precombustion chamber so as to produce a well-defined jet of air in the direction of said injection nozzle during the compression stroke of said piston, said insert means being provided with a collar-like inwardly-directed extension constituting the upper terminal wall of said spherical combustion chamber and shielding said injection nozzle in the direction of said precombustion chamber, said collar-like extension providing only a central opening therein for projecting fuel therethrough, and an annular intermediate member of pliable heat-conducting material between the collar-like extension of said insert means and the lower end face of said injection nozzle for shielding said injection nozzle, said intermediate member being in tight contact with said collar-like extension and the lower face of said injection nozzle, the throttling passage of said insert means discharging freely into said main combustion chamber at a point adjacent an essentially central relatively deep portion in said recess forming said main combustion chamber.

References Cited in the file of this patent

UNITED STATES PATENTS

| | | |
|---|---|---|
| 1,798,260 | Hehr | Mar. 31, 1931 |
| 2,080,189 | Schwaiger | May 11, 1937 |
| 2,148,505 | Rosen | Feb. 28, 1939 |
| 2,201,220 | Bokemuller et al. | May 21, 1940 |
| 2,316,269 | Maruhn | Apr. 13, 1943 |

OTHER REFERENCES

Ser. No. 368,293, Von Mallinckrodt (A. P. C.), published May 11, 1943.